(12) United States Patent
Raghavan et al.

(10) Patent No.: US 10,599,281 B2
(45) Date of Patent: Mar. 24, 2020

(54) DEVICES AND METHODS FOR MODIFYING TEMPORALLY DEPENDENT CONTENT ELEMENTS OF ELECTRONIC COMMUNICATIONS

(71) Applicant: Motorola Mobility LLC, Chicago, IL (US)

(72) Inventors: Krishnan Raghavan, Bangalore (IN); Amit Kumar Agrawal, Bangalore (IN); Vignesh Karthik Mohan, Bangalore (IN)

(73) Assignee: Motorola Mobility LLC, Chicago, IL (US)

(*) Notice: Subject to any disclaimer, the term of this patent is extended or adjusted under 35 U.S.C. 154(b) by 111 days.

(21) Appl. No.: 16/058,899

(22) Filed: Aug. 8, 2018

(65) Prior Publication Data

US 2018/0348963 A1  Dec. 6, 2018

Related U.S. Application Data

(63) Continuation of application No. 15/068,918, filed on Mar. 14, 2016, now Pat. No. 10,095,372.

(51) Int. Cl.
*G06F 3/0481* (2013.01)
*H04W 24/08* (2009.01)
(Continued)

(52) U.S. Cl.
CPC .............. *G06F 3/0481* (2013.01); *G06F 1/14* (2013.01); *G06Q 10/107* (2013.01); *G06Q 30/06* (2013.01);
(Continued)

(58) Field of Classification Search
CPC ........................................................ G06F 3/0481
(Continued)

(56) References Cited

U.S. PATENT DOCUMENTS 9,319,911 B2 * 4/2016 Gupta ................... H04W 24/08
9,544,800 B2 * 1/2017 Gupta ................... H04W 24/08
(Continued)

FOREIGN PATENT DOCUMENTS

EP       2669858       12/2013

OTHER PUBLICATIONS

Eadicicco, Lisa , "Apple has a brilliant idea to make text messaging a whole lot better", Article; Business Insider India; Published Jun. 16, 2015; https://www.businessinsider.in/Apple-has-a-brilliant-idea-to-make-text-messaging-a-whole-lot-better/articleshow/47696402.cms.

(Continued)

*Primary Examiner* — Reza Nabi
(74) *Attorney, Agent, or Firm* — Philip H. Burrus, IV

(57) ABSTRACT

An electronic device includes a wireless communication circuit and one or more processors. The one or more processors are operable to the one or more processors to detect an inability of the wireless communication circuit to transmit an electronic communication that includes one or more temporally dependent content elements. When this occurs, the one or more processors monitor a duration during which the wireless communication circuit is unable to transmit the electronic communication. Later the one or more processors alter the one or more temporally dependent content elements as a function of the duration to obtain a modified electronic communication, which is transmitted from the wireless communication circuit.

20 Claims, 7 Drawing Sheets

(51) Int. Cl.

| | | |
|---|---|---|
| *H04W 4/14* | (2009.01) | |
| *H04L 12/58* | (2006.01) | |
| *G06Q 10/10* | (2012.01) | |
| *G06F 1/14* | (2006.01) | |
| *G06Q 30/06* | (2012.01) | |
| *H04W 88/02* | (2009.01) | |

(52) U.S. Cl.
CPC ............... *H04L 51/38* (2013.01); *H04W 4/14* (2013.01); *H04W 24/08* (2013.01); *H04L 51/18* (2013.01); *H04W 88/02* (2013.01)

(58) Field of Classification Search
USPC ........................................................ 715/744
See application file for complete search history.

(56) References Cited

U.S. PATENT DOCUMENTS

| | | | | |
|---|---|---|---|---|
| 2005/0000010 A1* | 1/2005 | Hagan | ...................... | E04H 4/084 4/498 |
| 2005/0103354 A1* | 5/2005 | Miyauchi | ............... | A61B 6/032 128/898 |
| 2011/0000001 A1* | 1/2011 | Gur | ....................... | F41H 5/0492 2/2.5 |
| 2011/0000019 A1* | 1/2011 | Ito | ........................ | A61G 7/0507 5/428 |
| 2011/0000031 A1* | 1/2011 | Pichon | .................. | E04H 4/1654 15/1.7 |
| 2011/0019566 A1 | 1/2011 | Leemet et al. | | |
| 2011/0195727 A1* | 8/2011 | Proulx | ................. | G06Q 10/109 455/456.3 |
| 2011/0310867 A1* | 12/2011 | Kennedy | ............ | G01C 21/3461 370/338 |
| 2013/0000008 A1* | 1/2013 | Mizutani | ............ | A41D 13/0506 2/22 |
| 2013/0086437 A1* | 4/2013 | Manning | ............. | H04L 41/5067 714/57 |
| 2014/0000008 A1* | 1/2014 | Santiago | ................ | A01N 25/08 2/209.13 |
| 2014/0000030 A1* | 1/2014 | Robertson | .............. | A61G 7/012 5/611 |
| 2014/0000031 A1* | 1/2014 | Westermann | ............ | H02K 7/00 5/611 |
| 2014/0089417 A1 | 3/2014 | Van Os et al. | | |
| 2014/0309864 A1* | 10/2014 | Ricci | .................... | A61B 5/0077 701/36 |
| 2014/0317512 A1* | 10/2014 | Farinacci | .............. | G06F 3/0484 715/730 |
| 2017/0000026 A1* | 1/2017 | Seki | ....................... | A01D 45/10 |
| 2017/0262136 A1* | 9/2017 | Raghavan | ............. | G06F 3/0481 |
| 2018/0000009 A1* | 1/2018 | Baitinger | ............. | A01C 21/005 |
| 2018/0091407 A1* | 3/2018 | Tervonen | ............. | H04L 43/0852 |

OTHER PUBLICATIONS

Nabi, Reza, "Notice of Allowance", U.S. Appl. No. 15/068,918; filed Mar. 14, 2016; dated Aug. 13, 2018.

* cited by examiner

DEVICES AND METHODS FOR MODIFYING TEMPORALLY DEPENDENT CONTENT ELEMENTS OF ELECTRONIC COMMUNICATIONS

CROSS REFERENCE TO PRIOR APPLICATIONS

This application is a continuation application from, and thus claims priority and benefit under 35 U.S.C. § 120 from, U.S. application Ser. No. 15/068,918, filed Mar. 14, 2016, which is incorporated by reference for all purposes.

BACKGROUND

Technical Field

This disclosure relates generally to electronic devices, and more particularly to electronic devices with networking capabilities.

Background Art

"Intelligent" portable electronic devices, such as smart phones, tablet computers, and the like, are becoming increasingly powerful computational tools. Moreover, these devices are becoming more prevalent in today's society. For example, not too long ago a mobile telephone was a simplistic device with a twelve-key keypad that only made telephone calls. Today, "smart" phones, tablet computers, personal digital assistants, and other portable electronic devices not only make telephone calls, but also manage address books, maintain calendars, play music and videos, display pictures, and allow users to surf the web. While a wireless communication device used to be a luxury used to make telephone calls while on the go, many users today consider these devices as a necessity for keeping up with schedules, communications, and daily life.

As the capabilities of these electronic devices have progressed, so too have their user interfaces. While legacy devices generally included only a physical keypad, more modern devices include sophisticated user input devices such as touch sensitive displays and voice recognition systems. Users employ these user interfaces to input communications, calendar events, messages, and so forth.

Upon entry of such communications, processing issues can occur. Illustrating by example, there are instances where devices fail to process, send, or otherwise deliver such communications for various reasons. Such reasons can include network problems such as a lack of data connection or insufficient quality of services. Alternatively, a peer-to-peer networked component may be beyond a local communication range. Additionally, even when a device is within a reliable network, heavy network congestion can cause issues in processing communications.

Regardless of cause, delays in processing, sending, or receiving communications can have unexpected consequences. For instance, communications that include content with non-specific time references that are based upon a prerequisite specific time can lose there meaning. A text message stating, "I'll be home in ten minutes," is meaningless when delivered twenty minutes later. It would be advantageous to have improved methods and systems for preventing unexpected consequences arising when issues involving processing or communication of user input occur.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

DETAILED DESCRIPTION OF THE DRAWINGS

Figure 1:
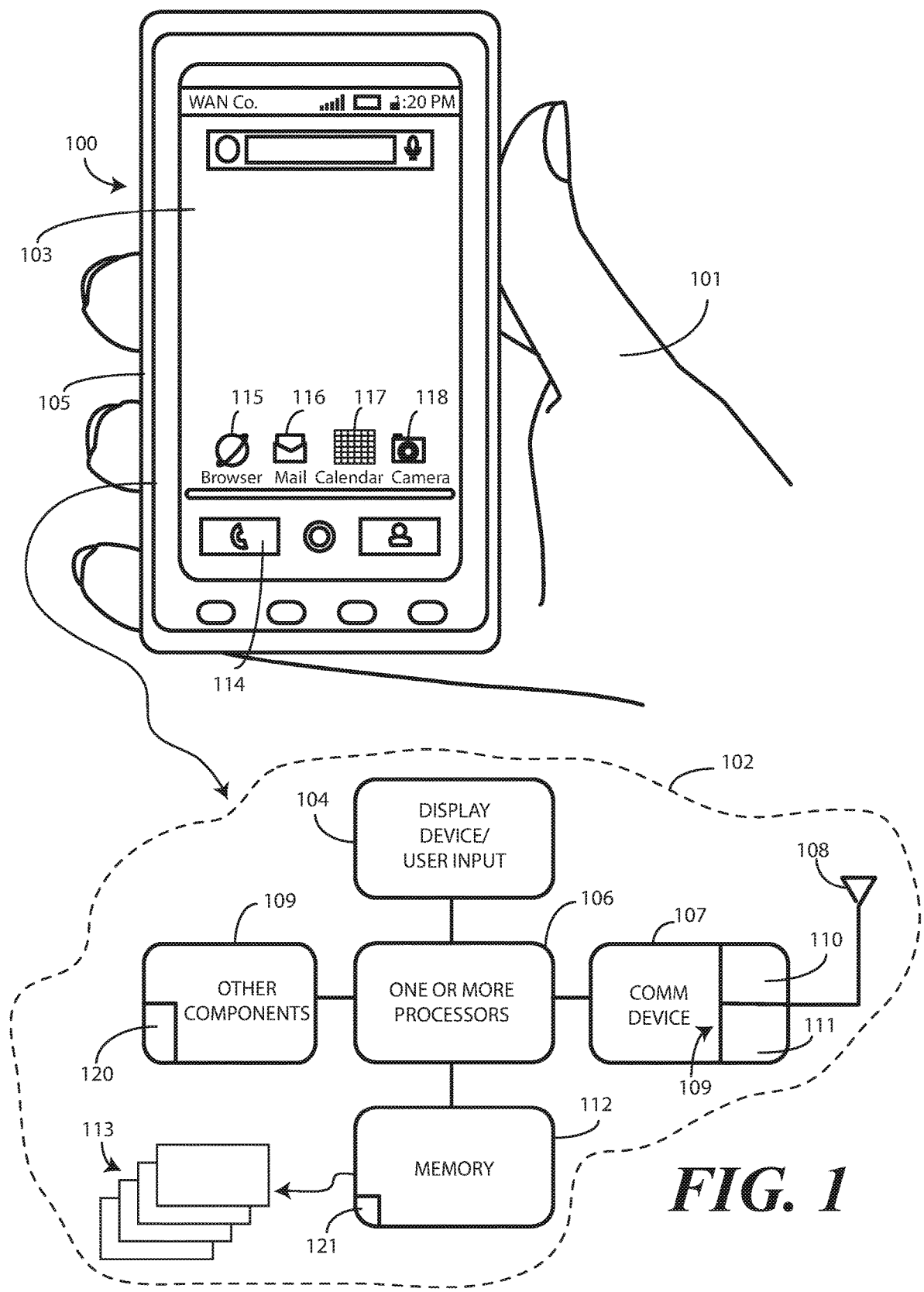
FIG. 1 illustrates one explanatory wireless communication device in accordance with one or more embodiments of the disclosure.

Before describing in detail embodiments that are in accordance with the present disclosure, it should be observed that the embodiments reside primarily in combinations of method steps and apparatus components related to modifying, with one or more processors, one or more temporally dependent content elements as a function of a duration during which the one or more processors are unable to process, send, receive, or otherwise act upon an electronic communication to transform the electronic communication to a modified electronic communication. Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user wireless communication technology, enable devices to modify electronic communications in response to network outages, network congestion, or other processing impediments to eliminate unexpected consequences occurring when communications include non-specific time references that are based upon a prerequisite specific time.

It will be appreciated that embodiments of the disclosure described herein may be comprised of one or more conventional processors and unique stored program instructions that control the one or more processors to implement, in conjunction with certain non-processor circuits, some, most, or all of the functions of modifying temporally dependent content elements as a function of a duration during which processing or communication delays occur to transform an electronic communication to a modified electronic communication as described herein. The non-processor circuits may include, but are not limited to, a radio receiver, a radio transmitter, signal drivers, clock circuits, power source circuits, and user input devices. As such, these functions may be interpreted as steps of a method to perform the modification of temporally dependent content elements as a function of a duration during which processing or communication delays occur. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

As noted above, modern electronic devices include increasingly sophisticated user input devices. As also noted above, due to their increased functionality, users are becoming increasingly reliant upon these electronic devices. In effect, users and their smart electronics are becoming increasingly interdependent. The users depend on their smart devices to help them perform the tasks of daily life more productively and more efficiently. At the same time, a smart device would merely sit idly on a desk without a person to use it.

While users and smart devices are interdependent, their interactions and mechanisms for processing data are quite different. Users think, communicate, and process data in a fluid, holistic manner, while smart devices are more robotic in that they break data down to its essential components and process the same in a logical, step-by-step manner. Illustrating by example, when it comes to indices of time, users communicate in natural, holistic expressions of time such as "sometime today," "tomorrow," "in a few hours," or "in the next three days." By contrast, smart devices employ highly accurate clocks and timing mechanisms that process data with millisecond precision.

Embodiments of the disclosure contemplate that when a user interacts with the user interface of a smart device, many of the communications delivered to the user interface are in terms of non-specific time indices that are dependent upon a specific time index. Illustrating by example, a user might say, "Set a reminder to complete task X in three days to meet the launch deadline." This communication includes temporally dependent elements, e.g., "in three days," that is non-specific in that it references no specific day. However, the action, i.e., set a reminder, is based upon a specific time, namely, when the user requests that the reminder be set. Accordingly, the time at which the communication is delivered becomes a precedential condition of when the reminder—as defined by the non-specific time index—occurs. Other examples, include the text message, "Please be at home—Buster will be arriving within the next three hours," or "set an alarm to wake me up in thirty minutes." Still other examples will be obvious to those of ordinary skill in the art having the benefit of this disclosure.

Embodiments of the disclosure contemplate that many temporally dependent content elements, whether included in electronic mail, text messages, multimedia messages, calendaring events, or other communications, depend upon a precedent condition to remain contextually accurate. For example, in the text message "Please be at home—Buster will be arriving within the next three hours," the "three hours" is dependent upon when the text message is sent.

Embodiments of the disclosure further contemplate that some of these communications are transmitted to other devices. However, the communications can originate and end at a single device, as would be the case when a smart device performs a web search. Still other communications may be between two of the user's devices, e.g., a smart watch and a smart phone, across a local area or peer-to-peer network. Embodiments of the disclosure contemplate that in each of these situations, issues can arise in which communications do not occur when intended by the user for various reasons. These reasons include the inability to communicate with a network, unsatisfactory quality of service, network congestion, or other reasons. Where this occurs, the accuracy, meaning, relevance, or significance of the temporally dependent content elements can be compromised or lost all together. In effect, when messages containing temporally dependent content elements are processed or communicated later than their precedent condition, the temporally dependent content elements may either convey incorrect message or mislead a receiving party, thereby leading to confusion.

Advantageously, embodiments of the present disclosure prevent unexpected consequences arising when issues involving processing or communication of user input occur. In one or more embodiments, a wireless communication device includes a wireless communication circuit and one or more processors. The one or more processors are operable to detect an inability of the wireless communication circuit to process or transmit an electronic communication comprising one or more temporally dependent content elements. This inability could be due to any of a variety of reasons, including an inability to communicate with a data work, a lack of network coverage, heavy network congestion, insufficient quality of service, or not being within a communication radius with another peer-to-peer device. Other reasons will be obvious to those of ordinary skill in the art having the benefit of this disclosure.

In one or more embodiments, when this occurs the one or more processors are operable to monitor a duration after the inability during which the wireless communication circuit is unable to process or transmit the electronic communication. The one or more processors can then alter the one or more temporally dependent content elements as a function of the duration to obtain a modified electronic communication. When the inability to process or communicate is removed, the one or more processors can then cause the wireless communication circuit to transmit the modified electronic communication. Accordingly, a recipient would receive the modified communication in which the modified temporally dependent content elements remain accurate and relevant.

Illustrating by example, in one embodiment a user has a smartphone configured in accordance with embodiments of the disclosure. The user initiates an outgoing communication using the user interface. For example, the user may type a text message that includes a body that has one or more temporally dependent elements. The message may be to his wife, stating, "I'll be home in two hours."

In one embodiment, the one or more processors of the smartphone then identify the fact that a temporally dependent component, i.e., "in two hours," appears in the message. The one or more processors may store such references in a data structure along with the exact time when the references was entered in the message. Once the message composition is complete, the user initiates a send action through the user interface. For instance, the user may tap the "send" user actuation target to send the message to his wife.

When the wireless communication circuit is unable to send the message, due to a lack of network coverage, network congestion, and so forth, in one or more embodiments the one or more processors can detect this. In one or more embodiments, the one or more processors can monitor the wireless communication circuit to determine a duration, i.e., how long, the wireless communication circuit is unable to transmit the message.

Since the delay between the time the user hits the send user actuation target and the time the message is sent can impact the temporally dependent content elements, in one or more embodiments the one or more processors modify the one or more temporally dependent content elements as a function of the duration to transform the electronic communication to a modified electronic communication. If, for example, the message was delayed by thirty minutes, the one or more processors may change the message "I'll be home in two hours" to the modified message "I'll be home in an hour and a half." Once this occurs, the one or more processors can cause the wireless communication circuit to transmit the modified electronic communication. Advantageously, the user's wife receives a message with temporally dependent content elements that are still relevant despite the delay. Thus, she still knows—with accuracy—when her husband is coming home despite the fact that her husband used a non-specific time index in the message.

In another example, consider the case where a user has a smart watch paired with a smart phone across a peer-to-peer local area network. Now consider that the smart watch has a voice controlled user interface that is operable with an alarm application operating on the smart phone. In such a scenario the user may, through the user interface of the smart watch, deliver a communication stating, "set an alarm for three hours from now." In so doing, the user's intention is to have the alarm application operating in his smart phone actuate an alarm three hours after delivering the communication.

However, if the smart phone is not within a predefined communication range of the peer-to-peer local area network when the command is delivered, the alarm may not be set when the command is delivered. If, for example, the user is in his office while the smart phone is in his car, the smart watch may not be able to communicate with the smart phone when the command is delivered. Accordingly, the command may not be delivered for another twenty minutes when the user gets into his car to drive home.

Advantageously, embodiments of the disclosure modify the one or more temporally dependent content elements as a function of the duration between which the command was delivered and when the command gets processed to transform the electronic communication to a modified electronic communication. Accordingly, the one or more processors of the smart watch in one embodiment, or the smart phone in another embodiment, detect that there has been a twenty minute delay and change "set an alarm for three hours from now" to be "set an alarm for two hours and forty minutes from now." This modified electronic communication is then processed in the smart phone. Advantageously, when this modification occurs, the alarm is still set at the appropriate time rather than twenty minutes too late. If for some reason the user didn't get in his car for four hours, in one or more embodiments the communication would not be processed. Instead, the user would be notified by the smart watch at the three-hour mark that the communication had not been processed. The above two examples are illustrative only. Others will be described in more detail below. Still others will be obvious to those of ordinary skill in the art having the benefit of this disclosure.

Turning now to FIG. 1, illustrated therein is one embodiment of an electronic device 100 configured in accordance with one or more embodiments of the disclosure. The electronic device 100 is a wireless communication device equipped to communicate with other electronic devices across a network. The explanatory electronic device 100 of FIG. 1 is shown as a smart phone for illustrative purposes. However, it will be obvious to those of ordinary skill in the art having the benefit of this disclosure that other electronic devices may be substituted for the explanatory smart phone of FIG. 1. For example, the electronic device 100 may be configured as a palm-top computer, a tablet computer, a gaming device, wearable computer, a media player, or other device.

A user 101 is holding the electronic device 100. A schematic block diagram 102 of the electronic device 100 is also shown. In this illustrative embodiment a display 103 serves as a primary user interface 104 and is disposed along a housing 105 of the electronic device 100. The user interface 104 is configured to receive user input from the user 101. The display 103 or other user interface 104 can also be configured to provide visual output, images, or other visible indicia to the user 101. For example, the display 103 or other user interface 104 can include an organic light emitting diode (OLED) device to render the images or visible indicia. The display 103 or other user interface 104 can include a touch sensor to receive user input. The display 103 or other user interface 104 can also be configured with a force sensor. Where so configured, one or more processors 106 of the electronic device 100 can be operable with the touch sensor and the force sensor to determine not only where the user 101 contacts the display 103 or other user interface 104, but also how much force the user 101 employs in making the contact.

In one or more embodiments, the electronic device 100 also includes a wireless communication circuit 107. The wireless communication circuit 107 can include wireless communication circuitry, one of a receiver, a transmitter, or transceiver, and one or more antennas 108. In one or more embodiments, the wireless communication circuit 107 is capable of communicating with one or more remote devices across a wide area network, local area network, small local area network (piconet), or personal area networks.

Examples of wide area networks include GSM, CDMA, W-CDMA, CDMA-2000, iDEN, TDMA, 2.5 Generation 3GPP GSM networks, 3rd Generation 3GPP WCDMA networks, 3GPP Long Term Evolution (LTE) networks, and 3GPP2 CDMA communication networks, UMTS networks, E-UTRA networks, GPRS networks, iDEN networks, and other networks. Examples of local area networks include HomeRF, Bluetooth.sup.™, and IEEE 802.11 (a, b, g or n) networks. Examples of ad hoc peer-to-peer networks include the one-hop and two-hop communication networks, with the former being referred to as a "piconet."

In one embodiment, the wireless communication circuit 107 comprises a local area network front end 109 configured as a single integrated circuit that includes multiple types of local area network communication protocols. For example, the local area network front end 109 can include both a Wi-Fi circuit 110 and another local area wireless communication circuit 111. The Wi-Fi circuit 110 can be configured to communicate via an IEEE 802.11 protocol, while the other local area wireless communication circuit 111 can be configured to communicate with a communication protocol other than the 802.11 standard. In some embodiments, only the Wi-Fi circuit 110 will be included. In other embodiments, only the other local area wireless communication circuit 111 will be included. Other configurations of the local area network front end 109 will be obvious to those of ordinary skill in the art having the benefit of this disclosure.

One example of a communication protocol operable on the other local area wireless communication circuit 111 is the Bluetooth.sup.™ communication protocol. Where the other local area wireless communication circuit 111 comprises a Bluetooth.sup.™ or Bluetooth Low Energy.sup.™ circuit, the local area network front end 109 can comprise a combined WiFI/Bluetooth.sup.™ integrated circuit. While Bluetooth.sup.™ is one explanatory communication protocol suitable for use with embodiments of the disclosure, embodiments are not so limited. Accordingly, other such communication protocols will be obvious to those of ordinary skill in the art having the benefit of this disclosure.

In one or more embodiments, the electronic device 100 also includes one or more processors 106 that are operable with the wireless communication circuit 107. The one or more processors 106 are responsible for performing the various functions of the electronic device 100. The one or more processors 106 can be a microprocessor, a group of processing components, one or more Application Specific Integrated Circuits (ASICs), programmable logic, or other type of processing device. The one or more processors 106 can be operable with the display 103 or other user interface 104, as well as various peripheral devices, ports, or connectors.

The one or more processors 106 can be configured to process and execute executable software code to perform the various functions of the electronic device 100. A storage device, such as memory 112, stores the executable software code used by the one or more processors 106 for device operation. The executable software code used by the one or more processors 106 can be configured as one or more modules 113 that are operable with the one or more processors 106. Such modules 113 can store instructions, control algorithms, and so forth.

In one embodiment, the one or more processors 106 are responsible for running the operating system environment of the electronic device 100. The operating system environment can be configured as executable code operating on one or more processors 106 or control circuits of the electronic device 100. The operating system environment can include a kernel, one or more drivers, and one or more layers of a protocol stack. These layers can include an application service layer, a network layer, a physical layer, a protocol layer, an application layer, and other layers, such as an anti-collision layer and a transfer layer. Each layer can operate in accordance with one or more activity parameters.

The operating system environment, which is configured as executable code operating on one or more processors 106, has associated therewith various applications or "apps." Examples of such applications shown in FIG. 1 include a cellular telephone application 114 for making voice telephone calls, a web browsing application 115 that allows browsing of Internet websites, an electronic mail application 116 configured to send and receive electronic mail, a calendaring application 117 to track calendar items, to-do lists, and reminders, and a camera application 118 configured to capture still (and optionally video) images. The web browsing application 115 may additionally allow the user 101 to search the web or the memory 112 of the electronic device 100 for items like contacts, lists, songs, media, desirous information on persons, places, and things, and so forth. These applications are illustrative only, as others will be obvious to one of ordinary skill in the art having the benefit of this disclosure.

The one or more processors 106 can be configured to one or more of launch one of the apps and/or enable data communication with one of the apps. In one or more embodiments, the one or more processors 106 are responsible for managing the applications and all data communications of the electronic device 100. Accordingly, the one or more processors 106 can be responsible for launching, monitoring and killing the various applications and the data communication with the various applications in response to receipt of messages, data payloads, and so forth as described above. The applications of the application layer can be configured as clients of the application service layer to communicate with services through application program interfaces (APIs), messages, events, or other inter-process communication interfaces.

The electronic device 100 can include other components 119 that are operable with the one or more processors 106 as well. The other components 119 can include output components such as video, audio, and/or mechanical outputs. For example, the output components may include a video output component or auxiliary devices including a cathode ray tube, liquid crystal display, plasma display, incandescent light, fluorescent light, front or rear projection display, and light emitting diode indicator. Other examples of output components include audio output components such as a loudspeaker disposed behind a speaker port or other alarms and/or buzzers and/or a mechanical output component such as vibrating or motion-based mechanisms.

The other components 119 can also include various sensors that are operable with the one or more processors 106. These sensors can include both physical sensors and virtual sensors. Physical sensors include sensors configured to sense or determine physical parameters indicative of conditions in an environment about an electronic device. The physical sensors can include various combinations of microphones, location detectors, motion sensors, physical parameter sensors, temperature sensors, barometers, proximity sensor components, proximity detector components, wellness sensors, touch sensors, cameras, audio capture devices, and so forth. Others will be obvious to those of ordinary skill in the art having the benefit of this disclosure.

By contrast, the virtual sensors do not measure physical conditions or parameters. Instead, they infer context from data of the electronic device. Illustrating by example, the virtual sensors may use data from a physical sensor, or from applications operating in the electronic device 100 to infer or detect one or more contextual cues. Similarly, a virtual sensor may consult the calendaring application 117, a contact list application, or other application operating within the electronic device 100 to determine contextual cues. Other virtual sensors may analyze other data to infer context, including user profiles, user purchasing history, device operating states, energy storage within a battery, application data, data from third parties such as web services and social media servers, alarms, time of day, behaviors a user repeats, and other factors. Others will be obvious to those of ordinary skill in the art having the benefit of this disclosure. The virtual sensors can be configured as either hardware components, or alternatively as combinations of hardware components and software components. The virtual sensors can collect and analyze non-physical parametric data in addition to physical data.

In one or more embodiments, the other components 119 include a voice interface engine 120. The voice interface engine 120 can include hardware, executable code, and speech monitor executable code in one embodiment. The voice interface engine 120 can include, stored in memory 112, basic speech models, trained speech models, or other modules that are used by the voice interface engine 120 to receive and identify voice commands that are received with audio input captured by an audio capture device. The voice interface engine 120 can also select and identify temporally dependent content elements in communications, commands, and other user input. In one embodiment, the voice interface engine 120 can include a voice recognition engine. Regardless of the specific implementation utilized in the various embodiments, the voice interface engine 120 can access various speech models to identify speech commands.

In one embodiment, the voice interface engine 120 is configured to implement a voice control feature that allows a user to speak a specific device command to cause the one or more processors 106 to execute a control operation. In one or more embodiments, a user can employ the voice interface engine 120 to deliver, and receive, audible commands and responses. For example, the user 101 may say, "Set a calendar appointment for lunch at Mac's tomorrow at noon." In one or more embodiments, the voice interface engine 120 is operable to process this command to set an event in the calendaring application 117.

In one embodiment, the voice interface engine 120 can further, sometimes in conjunction with the one or more processors 106, select and parse temporally dependent content elements from temporally independent content elements to process the message. In this illustrative embodiment, the elements "tomorrow" and "at noon" comprise temporally dependent content elements because they reference a time index. By contrast, "set a calendar appointment" and "at Mac's" are temporally independent content elements because they refer to a command and location that are independent of time. The content element "for lunch" can be a temporally dependent content element in that it connotes a time index during which lunch is customarily eaten. Thus, in one or more embodiments, the voice interface engine 120 is operable to select, in conjunction with the one or more processors 106, the one or more temporally dependent content elements from the temporally independent content elements.

In one or more embodiments, the voice interface engine 120 listens for voice commands that include temporally dependent content elements, and processes the commands. In some embodiments, the one or more processors 106 will, in response transmit communications to other electronic devices. However, in other embodiments the one or more processors 106 will, in response, return an output to the user 101 locally.

Figure 2:
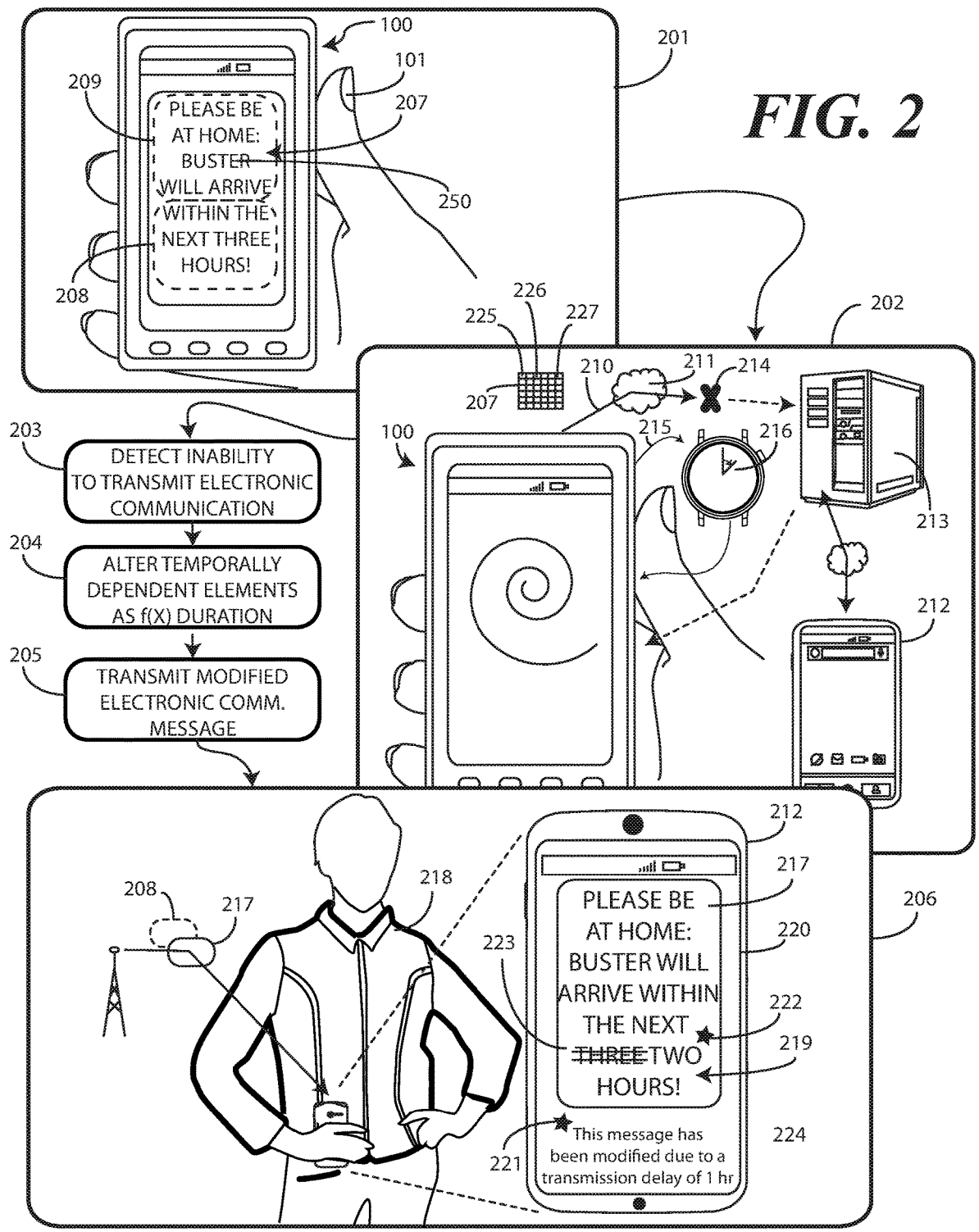
FIG. 2 illustrates one or more method steps and apparatus components in accordance with one or more embodiments of the disclosure.

Turning now to FIG. 2, illustrated therein are one or more method steps using an electronic device 100 configured in accordance with one or more embodiments of the disclosure. Beginning at step 201, the user 101 delivers a communication 207 to the user interface (104) of the electronic device 100. At step 201, the user interface (104) receives the electronic communication 207. In this illustrative embodiment, the communication 207 is an electronic communication configured as a text message that states, "Please be at home: Buster will arrive within the next three hours!" The user 101 can deliver the communication 207 to the user interface (104) in a variety of ways. For example, the user may type the communication 207 using one or more user actuation targets disposed along the display 103. Alternatively, the user 101 may speak the communication 207, with the voice interface engine (120) receiving the communication 207, converting it to text, and presenting it on the display 103 in the form of a text message. Other techniques for delivering the communication 207 to the user interface (104) will be obvious to those of ordinary skill in the art having the benefit of this disclosure.

In this illustrative embodiment, the communication 207 includes one or more message elements comprising textual data 250. It should be noted that the communication 207 could include other types of data, including pictures, videos, or other visual data, aural data such as voice memos, or other types of data. Here, the textual data 250 contains both temporally dependent content elements 208 and temporally independent content elements 209. The temporally dependent content elements 208 include "within the next three hours." These are temporally dependent content elements 208 because they reference a time index, i.e., within a predefined period. By contrast, the temporally independent content elements 209 include a command, i.e., "please be at home," a person, i.e., "Buster," and an action, i.e., "will arrive." At step 201, the one or more processors (106), working in conjunction with the voice interface engine (120), can receive, from the user interface (104), the one or more temporally dependent content elements 208 along with the remainder of the communication 207.

In one or more embodiments, one or both of the one or more processors (106) and/or the voice interface engine (120) is operable to identify and select the one or more temporally dependent content elements 208 from the temporally independent content elements 209. As noted above, in one or more embodiments to prevent unexpected consequences arising when issues involving processing or communication of user input occur, the one or more processors (106) can modify electronic communications in response to network outages, network congestion, or other processing impediments to eliminate unexpected consequences occurring when communications include non-specific time references that are based upon a prerequisite specific time.

Accordingly, in one or more embodiments after identifying and selecting the temporally dependent content elements 208 the one or more processors (106) can record, prior to any modification, the one or more temporally dependent content elements 208 from the communication 207 in a data structure (121) stored in memory (112).

At step 202, the one or more processors (106) of the electronic device 100 cause the wireless communication circuit (107) to attempt to transmit 210 the communication 207 across a network 211. In this illustrative embodiment, the network 211 is a wide area network. However, embodiments of the disclosure are not so limited. In other embodiments, as will be shown below with reference to FIGS. 3-4, the network 211 could be a local area network as well. Other networks will be obvious to those of ordinary skill in the art having the benefit of this disclosure.

In this illustrative embodiment, since the communication 207 is a text message, it is being sent to a remote electronic device 212. In some embodiments, the communication 207 will be sent across the network 211 to the remote electronic device 212 directly. In other embodiments, the communication 207 will be sent across the network 211 to a server 213, which forwards the communication to the remote electronic device 212. While these are some examples of how embodiments of the disclosure can operate, it should be noted that embodiments of the disclosure are not so limited.

Illustrating by example, in other embodiments the electronic device 100 may intend the communication 207 to be directed to the server 213 and then back to the electronic device 100. For instance, if the communication had been calendaring data, where the calendaring application (117) on the electronic device 100 was hosted "in the cloud," the calendaring data may have been sent to the server 213 with a response communication back to the electronic device 100 indicating that the calendaring data had been saved. Alternatively, if the communication 207 had been a voice command that initiated a search application hosted in the cloud, the voice communication may have been sent to the server 213 with a response communication back to the electronic device 100 with the search results. Accordingly, it should be understood that the wireless communication circuit (107) of the electronic device 100 can communicate with any of a server 213, remote electronic device 212, or itself in accordance with various embodiments of the disclosure.

Embodiments of the disclosure contemplate that there will be situations where the wireless communication circuit (107) is unable 214 to transmit the communication 207. As noted above, there can be any number of reasons why this inability 214 to transmit occurs. For example, the network 211 may be unavailable to the wireless communication circuit (107). Alternatively, there may be congestion or insufficient bandwidth in the network 211 to transmit the communication 207. If the network was a peer-to-peer network, the remote electronic device 212 may be out of range. These are some examples of why the wireless communication circuit (107) is unable 214 to transmit the communication 207. However, this is not an exhaustive list. Other reasons why the wireless communication circuit (107) has an inability 214 to transmit will be obvious to those of ordinary skill in the art having the benefit of this disclosure. In this illustrative embodiment, the inability 214 to transmit is due to a technical failure of the network 211.

It should be noted that the problem causing the inability 214 to transmit can occur at different locations as well. While shown as occurring between the electronic device 100 and the server 213, the problem could reside between the server 213 and the remote electronic device 212, or at another location, as well.

In one or more embodiments, the one or more processors (106) of the electronic device 100 are operable to identify one or more network failures at least temporarily precluding transmission of the communication 207. For example, in this illustration the inability 214 to transmit is due to a problem between the electronic device 100 and the server 213. The one or more processors (106) may be operable to identify this situation because no acknowledgement message is received from the server 213. Alternatively, the one or more processors (106) may determine from the wireless communication circuit (107) that there is an insufficient quality of service. Other techniques for identifying network failures at least temporarily precluding transmission of electronic communications will be obvious to those of ordinary skill in the art having the benefit of this disclosure.

In one or more embodiments, the one or more processors (106) of the electronic device 100 detect the inability 214 of the wireless communication circuit (107) to transmit the communication (207) at step 203. When this occurs, in one embodiment the one or more processors (106) then monitor 215 a duration 216 during which the wireless communication circuit (107) is unable to transmit the communication 207. To prevent unexpected consequences arising when issues involving processing or communication of user input occur, the one or more processors (106) can modify the communication at step 204. Specifically, in this embodiment the one or more processors (106) alter the one or more temporally dependent content elements 208 as a function of the duration 216 to obtain a modified electronic communication 217. At step 205, the one or more processors (106) then cause the wireless communication circuit (107) to transmit the modified electronic communication 217.

At step 206, a remote electronic device 212 belonging to another user 218 receives the modified electronic communication 217. The one or more processors of the remote electronic device 212 present, on the user interface 220 of the remote electronic device 212, the modified electronic communication 217.

In this illustration, the duration 216 during which the communication was unable to transmit the communication 207 across the network 211 was one hour. Accordingly, the more temporally dependent content elements 208 "within the next three hours" have been changed to modified temporally dependent content elements 219 "during the next two hours." Accordingly, the other user 218 is still apprised of an accurate time index despite the fact that the communication was delayed in transmission by an hour. Thus, if the communication 207 was sent by the user 101 at two o'clock, despite being delayed by an hour the other user 218 still knows that Buster will be arriving prior to five o'clock.

The modified electronic communication 217 can take a variety of forms. In some embodiments, the modified electronic communication 217 will look exactly the same as communication 207, but with the temporally dependent content elements 208 modified to become modified temporally dependent content elements 219. Thus, "Please be at home—Buster will arrive within the next three hours" would simply read "Please be at home—Buster will arrive within the next two hours."

However, in one or more embodiments, it may be helpful for the other user 218 to understand that there has been a modification from the original message. In the illustrative embodiment of FIG. 2, the modified electronic communication 217 comprises indicia 221 indicating the original electronic communication 207 has been modified. For example, here the indicia 221 includes a struck-through word 223 and an asterisk 222 pointing to a footnote 224 that indicates the communication 207 was modified. The struck-through word 223 could be used solely, as could the asterisk 222 and footnote 224. Here the two are used in combination for clarity. Note that the struck-through word 223 indicates not only that a change has been made, but what the change was. The footnote 224 takes this a step further, explaining why the communication 207 was modified. These examples of indicia 221 indicating the electronic communication 207 has been modified are examples only, as others will be obvious to those of ordinary skill in the art having the benefit of this disclosure.

In one or more embodiments, the communication 207 comprises several constituent parts. For example, the communication 207 can include a header 225, a body 226 comprising message elements, metadata 227, and other components. In one or more embodiments, the modifications to the communication 207 as a function of the duration 216 to transform the electronic communication 207 to a modified electronic communication 217 can include modifications to any of these constituent parts. For example, as will be shown below with reference to FIG. 5, in one embodiment rather than modifying the body 226 of the message as was the case in FIG. 2, the one or more processors (106) of the electronic device 100 can modify the metadata 227 instead. In other embodiments, both the body 226 and the metadata 227 will be modified. Other configurations will be obvious to those of ordinary skill in the art having the benefit of this disclosure.

In one or more embodiments, the other user 218 may wish to have the ability of seeing the original message. Accordingly, in one or more embodiments, in addition to transmitting the modified electronic communication 217, the electronic device 100 further transmits the original temporally dependent content elements. In the illustrative embodiment of FIG. 2, both the modified electronic communication 217 and the temporally dependent content elements 208 are transmitted to the remote electronic device 212 in a data structure that was stored in the electronic device 100. Said differently, in this illustrative embodiment electronic device 100 transmits the data structure (121) comprising the temporally dependent content elements 208 with the modified electronic communication 217, as shown at step 206. If she so desires, the other user 218 can manipulate the user interface 220 of the remote electronic device 212 to view the original temporally dependent content elements 208 as well.

Figure 3:
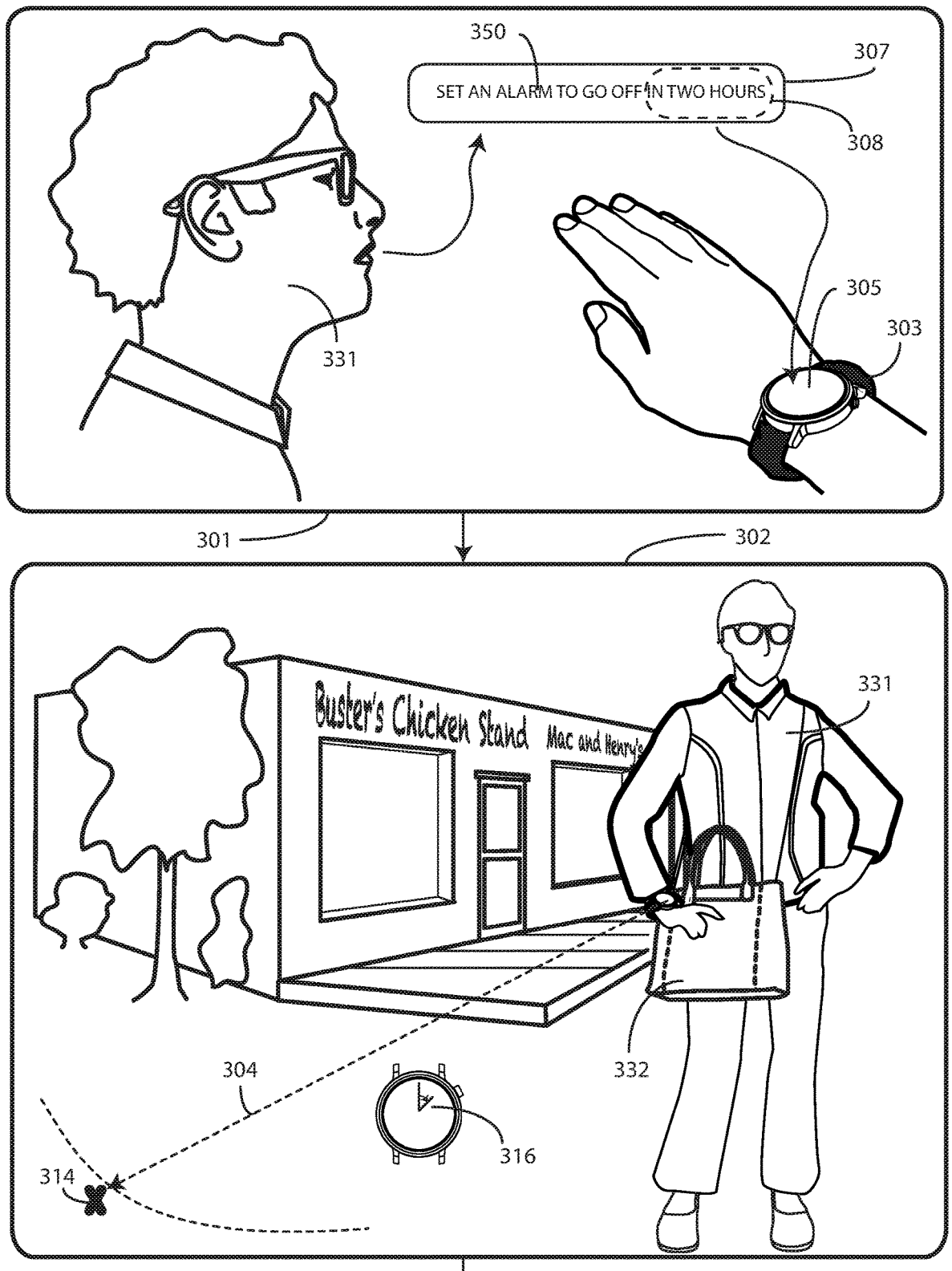
FIG. 3 illustrates one or more method steps and apparatus components in accordance with one or more embodiments of the disclosure.
Figure 4:
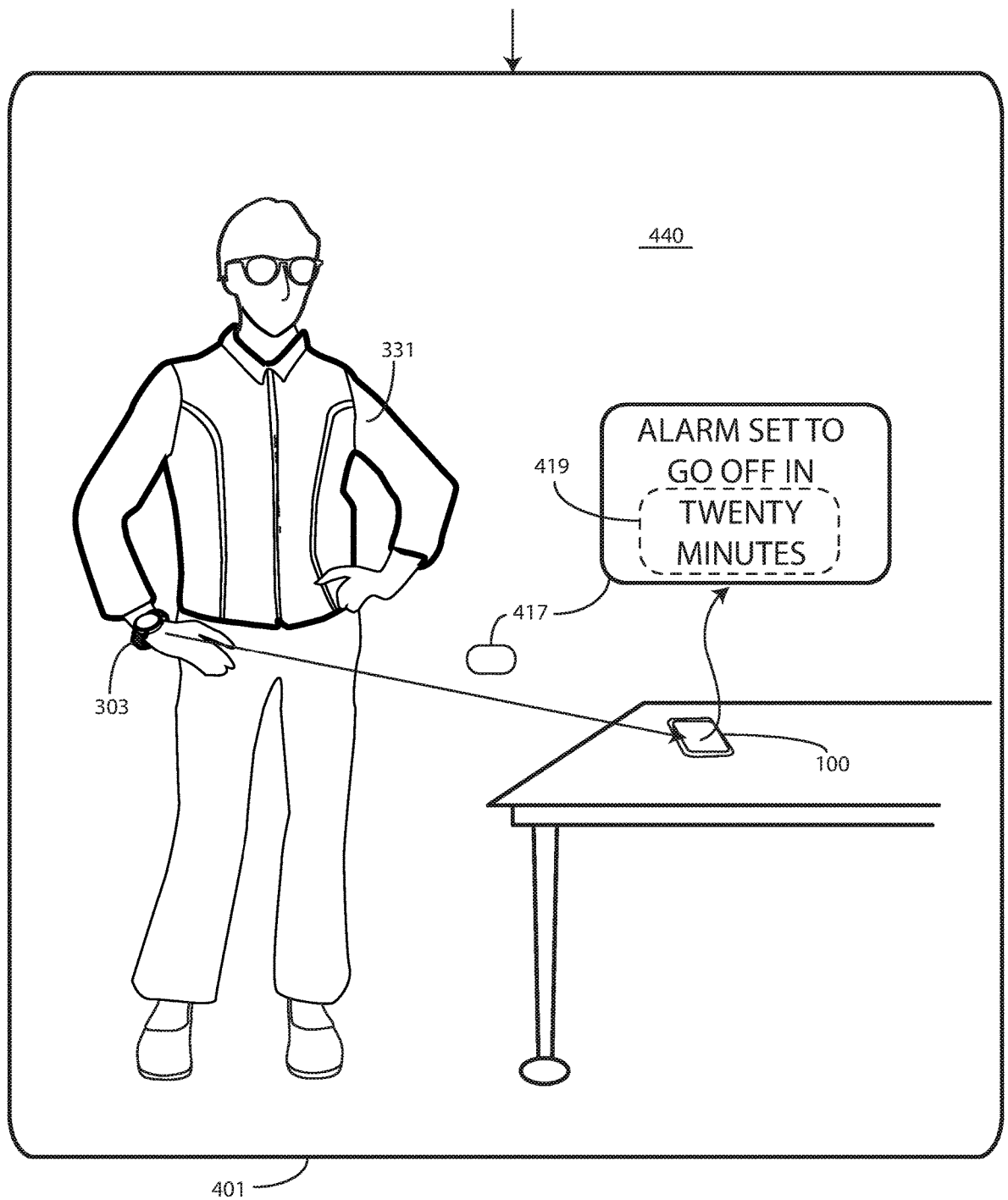
FIG. 4 illustrates one or more method steps and apparatus components in accordance with one or more embodiments of the disclosure.

Turning now to FIGS. 3-4, illustrated therein is another one or more method steps using an electronic device 100 configured in accordance with one or more embodiments of the disclosure. In this illustrative embodiment a user 331 has a smart watch that is paired as a companion device 303 to the electronic device 100. The companion device 303 can communicate across a local area, peer-to-peer network when the electronic device 100 is within a limited communication radius 304. However, when one device is beyond this limited communication radius 304 from the other, communication will not occur.

Beginning at step 301, the user 331 delivers a communication 307 to the user interface 305 of the companion device 303. In this illustrative embodiment, the user 331 delivers the communication 307 to the user interface 305 by speaking it. One or more processors disposed within the companion device 303 convert the speech to text (optionally with the help of a remote server), and store the communication 307 in a memory of the companion device. In this illustrative embodiment, the communication 307 comprises calendaring data 350, in that the user 331 has asked that an alarm be activated in two hours.

As shown at step 302, the user 331 is out shopping and has forgotten to put the electronic device 100 in her bag 332. Instead, she left the electronic device 100 at home 440. Accordingly, the electronic device 100 is beyond the limited communication radius 304. However, in this illustrative embodiment the calendaring application (117) within which calendaring data is operable runs natively on the electronic device 100. Consequently, the companion device 303 must transmit the communication 307 to the electronic device 100 for the alarm to be set.

Since the user 331 is shopping, the wireless communication circuit of the companion device 303 is unable 314 to deliver the communication 307 during this time. Accordingly, the one or more processors of the companion device determine a duration 316 during which the wireless communication circuit of the companion device 303 is unable to transmit the electronic communication 307. In this illustrative embodiment, the inability 314 of the wireless communication circuit of the companion device 303 to transmit the electronic communication 307 comprises an absence, as shown at step 302, of a companion device, i.e., electronic device 100, within a local area communication network defined by the limited communication radius 304. Since the electronic device 100 is not within the limited communication radius 304, the one or more processors of the companion device 303 then modify, as previously described, the one or more temporally dependent content elements 308 as a function of the duration 316 to transform the electronic communication 307 to a modified electronic communication 417.

At step 401, when the user 331 gets home 440, the modified electronic communication 417 is delivered to the electronic device 100. In this illustrative embodiment, the duration 316 was one hour and forty minutes. Accordingly, the temporally dependent content elements 308 of the electronic communication 307 have been modified to become modified temporally dependent content elements 419. In this illustrative example, the temporally dependent content elements 308 of "in two hours" has become modified temporally dependent content elements 419 "in twenty minutes." Accordingly, the alarm will still sound at the appropriate time. Note that had the user 331 not arrived home 440 within the two hours, the companion device 303 may have notified the user 331 that the alarm could not be set.

In both the embodiment of FIG. 2 and the embodiment of FIGS. 3-4, it is the one or more processors of the sending device that make the modification to the temporally dependent content elements as a function of the duration during which the wireless communication device is unable to transmit an electronic message to transform the electronic communication to a modified electronic communication. However, embodiments of the disclosure are not so limited. Embodiments contemplate that such modifications can be made at other locations as well. Illustrating by example, turning briefly back to FIG. 2, recall from above that an electronic communication 207 can have multiple constituent parts, including a header 225, a body 226 comprising message elements, metadata 227, and other components. Embodiments of the disclosure contemplate that the one or more processors of the electronic device 100 can, in one embodiment and instead of modifying the body 226 of a communication 207, modify metadata 227 so that another electronic device can use the modified metadata to itself modify the one or more temporally dependent content elements 208 as a function of the duration 216 to transform the electronic communication 207 to a modified electronic communication 217. For instance, the server 213 could use the modified metadata modify the one or more temporally dependent content elements 208 as a function of the duration 216 to transform the electronic communication 207 to a modified electronic communication 217 after receiving the electronic communication 207, but prior to transmitting the modified electronic communication 217 to the remote electronic device 212.

Figure 5:
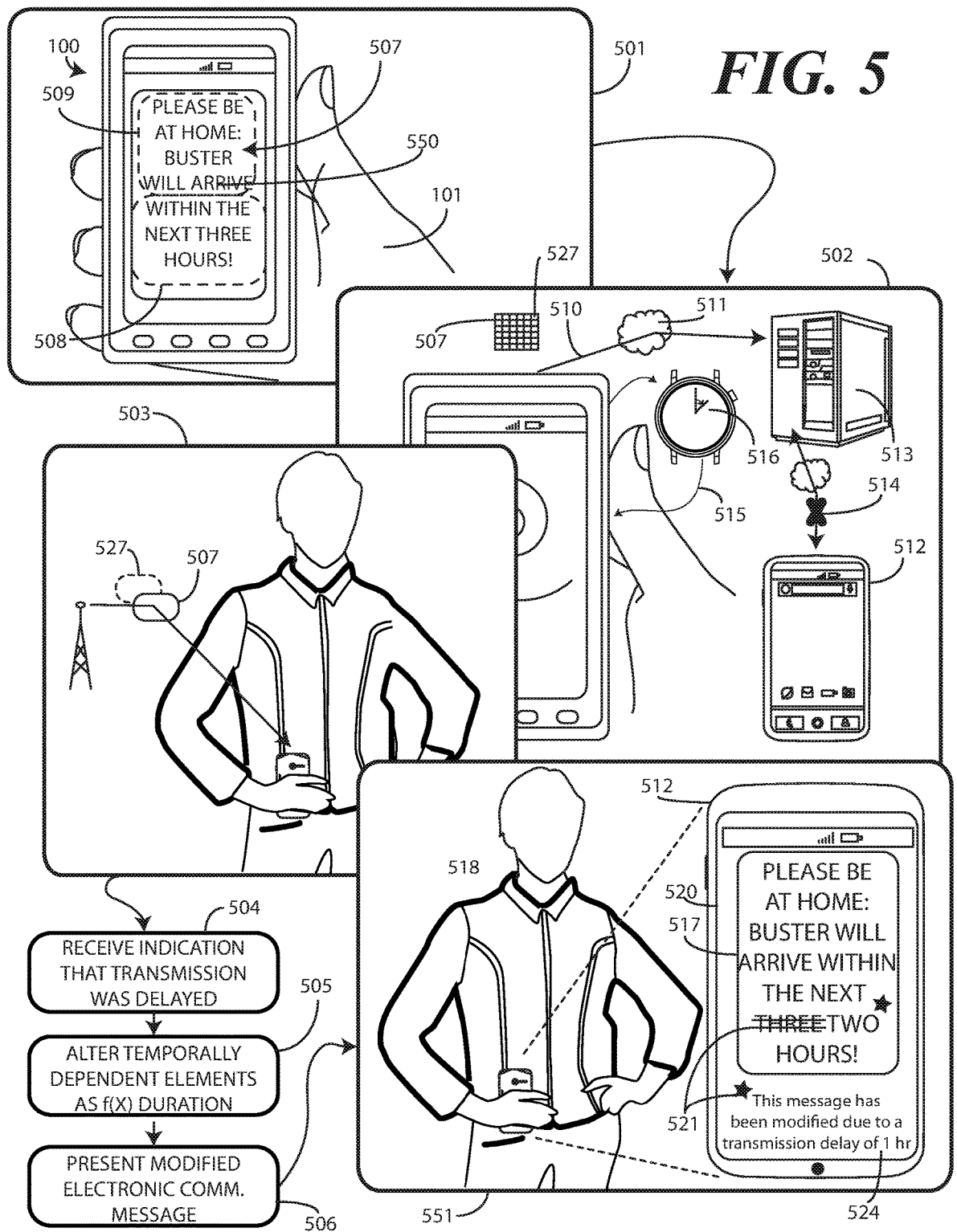
FIG. 5 illustrates one or more method steps and apparatus components in accordance with one or more embodiments of the disclosure.

In another embodiment, a receiving device can use the modified metadata to modify the one or more temporally dependent content elements 208 as a function of the duration 216 to transform the electronic communication 207 to a modified electronic communication 217. Turning now to FIG. 5, illustrated therein is such an embodiment.

Beginning at step 501, a user 101 delivers a communication 507 to the user interface (104) of the electronic device 100. In this illustrative embodiment, the communication 507 comprises textual data 550 and is the same as in FIG. 2, in which the communication 507 is a text message that states, "Please be at home: Buster will arrive within the next three hours!" As before, the textual data 550 includes both temporally dependent content elements 508 and temporally independent content elements 509, with the temporally dependent content elements 508 comprising the words "within the next three hours." The temporally dependent content elements 508 reference a time index, i.e., with in the next three hours, which is a predefined time period.

At step 502, the one or more processors (106) of the electronic device 100 cause the wireless communication circuit (107) to attempt to transmit 510 the communication 507 across a network 511 to a remote electronic device 512 via a server 513. A network error 514 occurs between the server 513 and the remote electronic device 512.

In one or more embodiments, the one or more processors (106) of the electronic device 100 are operable to identify the network error 514 or network failure precluding transmission of the communication 507 at step 502. When this occurs, in one embodiment the one or more processors (106) then monitor 515 a duration 516 during which the wireless communication circuit (107) is unable to transmit the communication 507.

In this illustrative embodiment, rather than modifying the temporally dependent content elements 508 appearing in the textual data 550 of the communication 507 as a function of the duration 516, the one or more processors (106) of the electronic device 100 instead modify the metadata 527 of the communication 507. Illustrating by example, the one or more processors (106) can modify the metadata 527 to include the temporally dependent content elements 508 and an indication that they should be modified as a function of the duration 516. Alternatively, the one or more processors (106) can alter metadata 527 corresponding to the one or more temporally dependent content elements 508 as a function of the duration 516 to provide modified temporally dependent content elements suitable for inclusion in the textual data 550 of the communication 507. Other examples of techniques by which to modify the communication 507 obtain a modified electronic communication will be obvious to those of ordinary skill in the art having the benefit of this disclosure. At step 503, the one or more processors (106) then cause the wireless communication circuit (107) to transmit the electronic communication 507 and the modified metadata 527.

At step 504, the wireless communication circuit of a remote electronic device 512 belonging to another user 518 receives the electronic communication 507 and the metadata 527. The metadata 527 comprises an indication that a transmitting device, i.e., electronic device 100, was unable to transmit the electronic communication 507 for a duration 516. At step 505, the one or more processors of the remote electronic device 512 then alter the one or more temporally dependent content elements 508 of the electronic communication 507 as a function of the duration 516 to obtain a modified electronic communication 517. At step 506, the one or more processors of the remote electronic device 512 then present the modified electronic communication 517 on the user interface 520. The results are shown at step 551.

In this illustrative embodiment, as with FIG. 2, the one or more processors of the receiving device further present indicia 521 at the user interface 520 indicating the one or more temporally dependent content elements 508 have been altered. Here, to show the contents of the original message in addition to the modified message, the original temporally dependent content elements 508, i.e., "within the next three hours," is presented on the user interface. However, "three" has been struck through with the new adjective "two" placed beside the strike through. Additionally, a footnote 524 is provided to explain why the modification was made.

As shown and described in FIGS. 2-5, embodiments of the disclosure provide an electronic device where a communication is queued due to a communication problem such as a lack of data connectivity for delivery a later point of time. Depending on when the communication is delivered, an unmodified communication may provide incorrect information. Moreover, an unmodified communication could cause inconvenience and a less than desirable user experience. Advantageously, embodiments of the disclosure modify and correct queued and delayed communications as a function of the duration during which the communication cannot be delivered.

Embodiments of the disclosure can be used to modify all different types of communications. In the embodiment of FIG. 2, textual data was modified. In the embodiment of FIGS. 3-4, calendaring data was modified. In the embodiment of FIG. 5, metadata was modified. Other examples will be obvious to those of ordinary skill in the art having the benefit of this disclosure. For example, if the communication is a voice message, the one or more processors may modify aural data by substituting words for words in the voice message. Similarly, of the message is a picture, the one or more processors may modify pictorial elements, e.g., changing the sky from blue during the day to a dark night sky, as a function of the duration.

Embodiments of the disclosure are also applicable to many different applications. In one embodiment, one or more processors of an electronic device may modify a search request, alarm, or calendaring event where the search request, alarm, or calendaring event is modified with the assistance of a server, but where the source and destination are the same device. For example, if an electronic device uses a server having voice recognition capabilities, the device may transmit a search request to the server to convert voice to text, with the text being delivered back to the same electronic device. If there were a delay, this communication may be modified in light of a time stamp based on network connection delay. However, embodiments of the disclosure could be extended to other applications, including on-line auctions, ecommerce applications, financial applications, and so forth. Still other applications will be obvious to those of ordinary skill in the art having the benefit of this disclosure.

Figure 6:
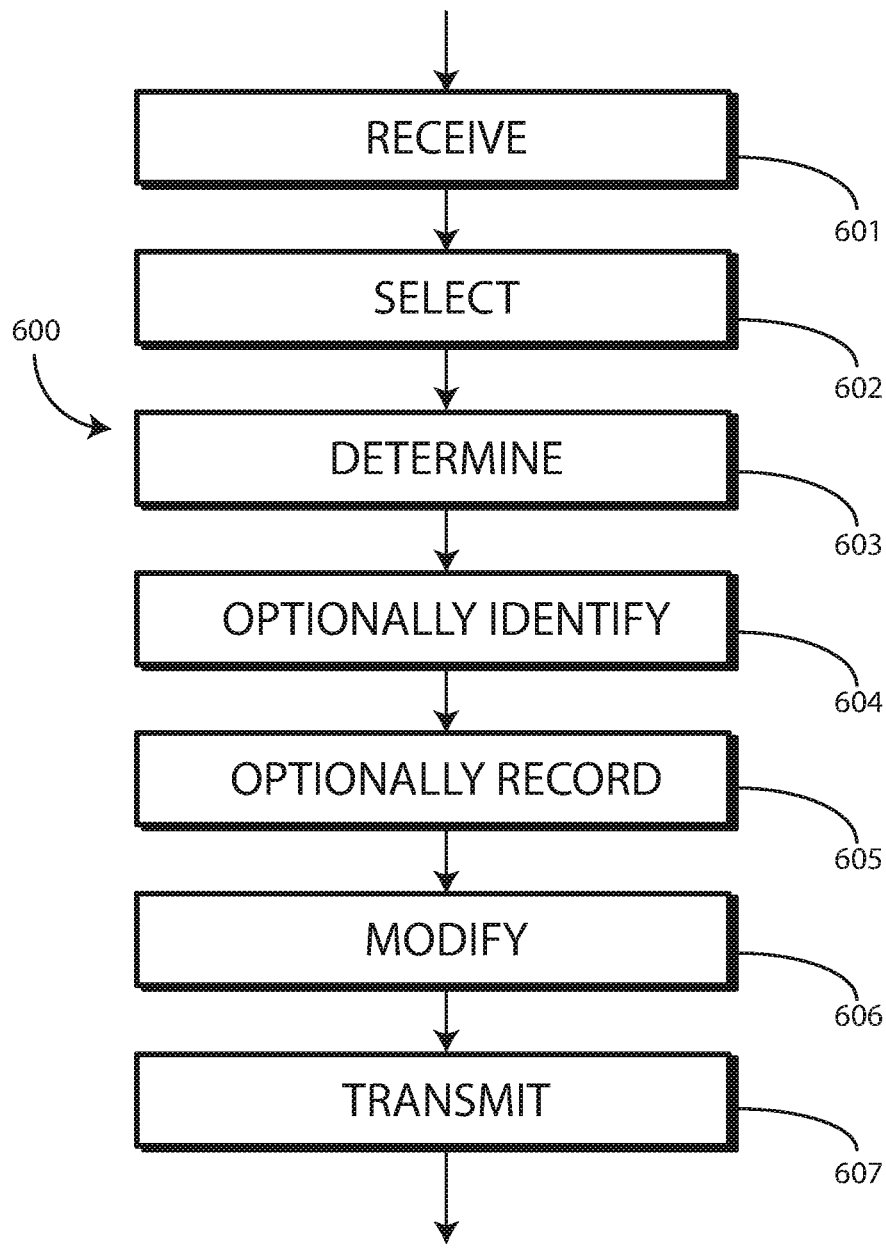
FIG. 6 illustrates one explanatory method in accordance with one or more embodiments of the disclosure.

Turning now to FIG. 6, illustrated therein is one explanatory method 600 in accordance with one or more embodiments of the disclosure. Beginning at step 601, the method 600 receives an electronic communication from a user interface of an electronic device. In one embodiment, the electronic communication received at step 601 includes one or more temporally dependent content elements. In one embodiment, the one or more temporally dependent content elements comprise an index of time.

In one embodiment, the one or more temporally dependent content elements comprise one or more message elements. One example of such message elements comprises textual data. Another example of one or more message elements comprises calendaring data. In other embodiments, in addition to or instead of temporally dependent content elements or temporally dependent message elements, the electronic communication can comprise one or more temporally dependent content elements comprising metadata. Other examples of temporally dependent content elements will be obvious to those of ordinary skill in the art having the benefit of this disclosure.

The electronic communication can also include one or more temporally independent content elements. At optional step 602, in one embodiment where the electronic communication also includes one or more temporally independent content elements, the one or more processors of the electronic device select the one or more temporally dependent content elements from the temporally independent content elements.

At step 603, the method 600 determines a duration during which a wireless communication circuit of the electronic device is unable to transmit the electronic communication. At optional step 604, the method 600 identifies one or more network failures at least temporarily precluding transmission of the electronic communication during the duration. At optional step 605, the method 600 records the one or more temporally dependent content elements in a data structure.

At step 606, the method 600 modifies the one or more temporally dependent content elements as a function of the duration to transform the electronic communication to a modified electronic communication. At step 607, the method 600 transmits the modified electronic communication across a network.

Figure 7:
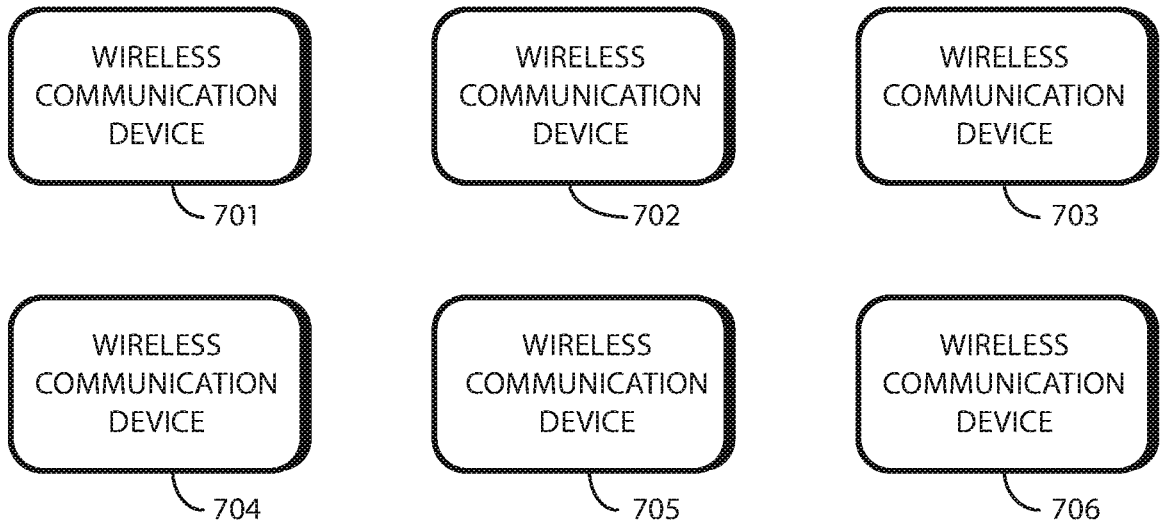
FIG. 7 illustrates various embodiments of the disclosure.

Turning now to FIG. 7, illustrated therein are one or more embodiments of the disclosure. At 701, a wireless communication device comprises a wireless communication circuit and one or more processors operable with the wireless communication circuit. At 701, the one or more processors are to detect an inability of the wireless communication circuit to transmit an electronic communication comprising one or more temporally dependent content elements. At 701, the one or more processors are to monitor a duration after the inability during which the wireless communication circuit is unable to transmit the electronic communication. At 701, the one or more processors are to alter the one or more temporally dependent content elements as a function of the duration to obtain a modified electronic communication. At 701, the one or more processors cause the wireless communication circuit to transmit the modified electronic communication.

At 702, the electronic device of 701 comprises a user interface operable with the one or more processors. At 702, the one or more processors receive the electronic communication from the user interface. At 703, the one or more processors present, on the user interface of 702, indicia indicating the electronic communication has been modified.

At 704, the inability of the wireless communication circuit to transmit the electronic communication at 701 comprises a network failure. At 705, the inability of the wireless communication circuit to transmit the electronic communication at 701 comprises an absence of a companion device within a local area communication network. At 706, the one or more processors transmit, in addition to the modified electronic communication of 701, the one or more temporally dependent content elements.

Figure 8:
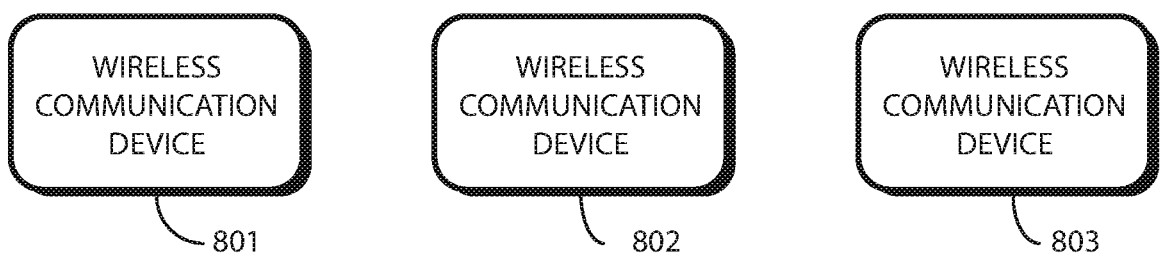
FIG. 8 illustrates various embodiments of the disclosure.

Turning now to FIG. 8, illustrated therein are other embodiments of the disclosure. At 801, a wireless communication device comprises a wireless communication circuit and one or more processors operable with the wireless communication circuit. At 801, the wireless communication device also includes a user interface operable with the one or more processors. At 801, the one or more processors are to receive, from the wireless communication circuit, an electronic communication comprising one or more temporally dependent content elements and an indication that a transmitting device was unable to transmit the electronic communication for a duration. At 801, the one or more processors alter the one or more temporally dependent content elements as a function of the duration to obtain a modified electronic communication. At 801, the one or more processors present the modified electronic communication on the user interface.

At 802, the one or more processors further to present indicia at the user interface indicating the one or more temporally dependent content elements have been altered. At 803, the one or more processors further present the one or more temporally dependent content elements on the user interface. Other embodiments will be obvious to those of ordinary skill in the art having the benefit of this disclosure.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method in a wireless communication device, the method comprising:
   determining, with one or more processors operable with a wireless communication circuit, a duration during which the wireless communication circuit is unable to transmit an electronic communication from the wireless communication device, the electronic communication comprising one or more temporally dependent content elements;
   modifying, with the one or more processors, the one or more temporally dependent content elements as a function of the duration to transform the electronic communication to a modified electronic communication; and transmitting, with the wireless communication circuit, the modified electronic communication;

the modified electronic communication comprising indicia, the indicia comprising at least a struck-through word;

the one or more temporally dependent content elements comprising one or more message elements of the electronic communication, the one or more message elements comprising textual data transmitted from the wireless communication device to a receiving device.

2. The method of claim 1, further comprising recording, with the one or more processors and prior to the modifying, the one or more temporally dependent content elements in a data structure.

3. The method of claim 2, the transmitting further comprising transmitting the data structure with the modified electronic communication.

4. The method of claim 1, the one or more temporally dependent content elements comprising metadata of the electronic communication.

5. The method of claim 1, the one or more temporally dependent content elements comprising one or more message elements of the electronic communication.

6. The method of claim 5, the one or more message elements comprising textual data.

7. The method of claim 5, the one or more message elements comprising calendaring data.

8. The method of claim 1, further comprising identifying one or more network failures at least temporarily precluding transmission of the electronic communication during the duration.

9. The method of claim 1, further comprising receiving, from a user interface operable with the one or more processors, the one or more temporally dependent content elements.

10. The method of claim 1, the electronic communication further comprising temporally independent content elements, the method further comprising selecting, with the one or more processors, the one or more temporally dependent content elements from the temporally independent content elements.

11. The method of claim 1, the one or more temporally dependent content elements comprising an index of time.

12. A wireless communication device, comprising:
a wireless communication circuit; and
one or more processors operable with the wireless communication circuit;
the one or more processors to:
detect an inability of the wireless communication circuit to transmit an electronic communication from the wireless communication device to a receiving device, the electronic communication comprising one or more temporally dependent content elements;
monitor a duration after the inability during which the wireless communication circuit is unable to transmit the electronic communication;
alter the one or more temporally dependent content elements as a function of the duration to obtain a modified electronic communication; and cause the wireless communication circuit to transmit the modified electronic communication wherein the modified electronic communication comprises an indicia wherein the indicia includes at least a struck-through word, wherein the one or more temporally dependent content elements comprising one or more message elements of the electronic communication, wherein the one or more message elements comprising textual data transmitted from the wireless communication device to the receiving device.

13. The wireless communication device of claim 12, further comprising a user interface operable with the one or more processors, the one or more processors further to receive the electronic communication from the user interface.

14. The wireless communication device of claim 12, the one or more processors further to present, with the user interface, indicia indicating the electronic communication has been modified.

15. The wireless communication device of claim 12, the inability of the wireless communication circuit to transmit the electronic communication comprising a network failure.

16. The wireless communication device of claim 12, the inability of the wireless communication circuit to transmit the electronic communication comprising an absence of a companion device within a local area communication network.

17. The wireless communication device of claim 12, the one or more processors further to cause the wireless communication circuit to transmit the one or more temporally dependent content elements.

18. A wireless communication device, comprising:
a wireless communication circuit;
one or more processors operable with the wireless communication circuit; and a user interface operable with the one or more processors; the one or more processors to:
receive, from the wireless communication circuit, an electronic communication from the wireless communication device to a receiving device, the electronic communication comprising one or more temporally dependent content elements; and an indication that a transmitting device was unable to transmit the electronic communication for a duration; alter the one or more temporally dependent content elements as a function of the duration to obtain a modified electronic communication; and present the modified electronic communication on the user interface wherein the modified electronic communication comprises an indicia wherein the indicia includes at least a struck-through word, wherein the one or more temporally dependent content elements comprising one or more message elements of the electronic communication, wherein the one or more message elements comprising textual data transmitted from the wireless communication device to the receiving device.

19. The wireless communication device of claim 18, the one or more processors further to present indicia at the user interface indicating the one or more temporally dependent content elements have been altered.

20. The wireless communication device of claim 18, the one or more processors further to present the one or more temporally dependent content elements on the user interface.

* * * * *